United States Patent
Oonishi

(10) Patent No.: US 8,293,060 B2
(45) Date of Patent: Oct. 23, 2012

(54) LASER BEAM WELDING METHOD AND MOUNTING STRUCTURE FOR WELDING LIGHT-ABSORPTION RESIN MEMBER AND TRANSLUCENT RESIN MEMBER

(75) Inventor: Jun Oonishi, Mizuho (JP)

(73) Assignee: Denso Corporation, Kariya (JP)

( * ) Notice: Subject to any disclaimer, the term of this patent is extended or adjusted under 35 U.S.C. 154(b) by 930 days.

(21) Appl. No.: 12/290,743

(22) Filed: Nov. 3, 2008

(65) Prior Publication Data

US 2009/0115111 A1 May 7, 2009

(30) Foreign Application Priority Data

Nov. 6, 2007 (JP) ................................. 2007-288251

(51) Int. Cl.
*B29C 35/02* (2006.01)
(52) U.S. Cl. .................................................... 156/272.8
(58) Field of Classification Search ............... 156/272.2, 156/272.8; 219/121.64
See application file for complete search history.

(56) References Cited

U.S. PATENT DOCUMENTS

| 2004/0239007 | A1 | 12/2004 | Arai et al. | |
| 2005/0191472 | A1 | 9/2005 | Oonishi | |
| 2005/0218123 | A1* | 10/2005 | Hayakawa et al. | 219/121.64 |

FOREIGN PATENT DOCUMENTS

| JP | 2004-216839 | | 8/2004 |
| JP | 2004-358697 | | 12/2004 |
| JP | 2005-238751 | | 9/2005 |
| JP | 2005-288934 | | 10/2005 |
| JP | 2006-258508 | | 9/2006 |
| JP | 2007-210165 | | 8/2007 |
| JP | 2007210165 A | * | 8/2007 |
| JP | 2007/313821 | | 12/2007 |
| JP | 2007313821 A | * | 12/2007 |

OTHER PUBLICATIONS

Machine Translation of JP 2007313821 A, Dec. 2007.*
Machine Translation of JP 2007210165 A, Aug. 2007.*
Office action dated Nov. 2, 2009 in corresponding Japanese Application No. 2007-288251.

* cited by examiner

*Primary Examiner* — Daniel McNally
(74) *Attorney, Agent, or Firm* — Harness, Dickey & Pierce, PLC

(57) ABSTRACT

A method for laser beam welding includes: forming a triangle protrusion on a light-absorption resin member; pressing a top of the protrusion on a translucent resin member; contacting the top of the protrusion and a part of the light-absorption resin member on the translucent resin member; irradiating a laser beam on the protrusion through the translucent resin member; and welding the translucent resin member to the light-absorption resin member with melted resin of the protrusion. The protrusion has a height, which provides to set deformation of the translucent resin member within a limit of a tensile strength of the translucent resin member, and the deformation of the translucent resin member is caused by the pressing the top of the protrusion.

6 Claims, 3 Drawing Sheets

# LASER BEAM WELDING METHOD AND MOUNTING STRUCTURE FOR WELDING LIGHT-ABSORPTION RESIN MEMBER AND TRANSLUCENT RESIN MEMBER

CROSS REFERENCE TO RELATED APPLICATION

This application is based on Japanese Patent Application No. 2007-288251 filed on Nov. 6, 2007, the disclosure of which is incorporated herein by reference.

FIELD OF THE INVENTION

The present invention relates to a method for laser beam welding and a mounting structure for welding a light-absorption resin member and a translucent resin member with a laser beam.

BACKGROUND OF THE INVENTION

A laser welding method for resin material is well-known. A laser beam is irradiated on light-absorption resin material through translucent resin material so that a connection portion between the light-absorption resin material and the translucent resin material is welded.

To improve connection property, for example, to reduce generation of a burr and a void, a protrusion is formed on a bonding surface of the translucent resin material. A part of the translucent resin material that is disposed outside of a laser beam irradiation area presses the light-absorption resin material. Then, the laser beam is irradiated on the protrusion. Thus, the resin material is welded by the laser beam. This laser beam welding method is disclosed in JP-A-2004-358697 corresponding to US Patent Application Publication No. 2004/0239007. Further, JP-A-2005-288934 corresponding to US Patent Application Publication No. 2005/0218123 discloses that the vertical cross section of the protrusion is a triangle shape. This method is described in FIG. 2. In FIG. 2, a reference numeral 101 represents the light-absorption resin material, 102 represents the translucent resin material, and 103 represents a triangle protrusion.

A periphery portion of a translucent resin cover is welded on an upper sidewall of an opening portion of a light-absorption resin vessel, as shown in FIG. 3.

In FIG. 3, a reference numeral 20 represents a sidewall of the light-absorption resin vessel, 21 represents the upper surface of the sidewall 20, and 22 represents the translucent resin cover. A reference numeral 23 represents a triangle protrusion disposed on the upper surface 21, 24 represents a rib, which stand from the upper surface 21 along with the outer periphery surface 25 of the sidewall 20. A pressing jig 26 presses a part of the translucent resin cover 22, which is disposed outside of the laser beam irradiation area. When the laser beam 27 is irradiated on the translucent resin cover 22, the protrusion 23 melts, so that the translucent resin cover 22 is pressed by the pressing jig 26. Thus, the translucent resin cover 22 moves, i.e., turns down toward the upper surface 21 of the sidewall 20. Because of this displacement of the translucent resin cover 22, the melted resin of the protrusion 23 moves to both sides of the protrusion 23 so that the melted resin fills a small concavity and convexity of the upper surface 21 of the sidewall 20. At this time, generated gas and residual air disposed near the upper surface 21 are pushed aside by the melted resin moving away from the protrusion 23, so that the gas and the air are discharged to both sides of the protrusion 23. As a result, the bottom of the translucent resin cover 22 is sufficiently welded on the upper surface 21 of the sidewall 20. Here, in FIG. 3, the upper surface 21 of the sidewall 20 from a bottom side adjacent to the protrusion 23 to the rib 24 slopes toward the rib 24. Alternatively, the upper surface 21 may be flat.

However, in the above conventional laser beam welding method with the triangle protrusion, a micro clack may be generated in the translucent resin cover 22.

SUMMARY OF THE INVENTION

In view of the above-described problem, it is an object of the present disclosure to provide a method for laser welding. It is another object of the present disclosure to provide a mounting structure for welding a light-absorption resin member and a translucent resin member with a laser beam.

According to a first aspect of the present disclosure, a method for laser beam welding includes: forming a triangle protrusion on a bonding surface of a light-absorption resin member; pressing a top of the triangle protrusion on a bonding surface of a translucent resin member; contacting the top of the protrusion and a predetermined part of the bonding surface of the light-absorption resin member on the bonding surface of the translucent resin member; irradiating a laser beam on the triangle protrusion through the translucent resin member so that the triangle protrusion melts; and welding the bonding surface of the translucent resin member to the bonding surface of the light-absorption resin member with melted resin of the triangle protrusion. The triangle protrusion has a height, which provides to set deformation of the translucent resin member within a limit of a tensile strength of the translucent resin member, and the deformation of the translucent resin member is caused by the pressing the top of the protrusion.

In the above method, since the deformation of the translucent resin member is smaller than the limit of the tensile strength of the translucent resin member, a micro clack is not generated by bending stress generated in the translucent resin member near the top of the protrusion.

According to a second aspect of the present disclosure, a method for laser beam welding includes: forming a triangle protrusion on a bonding surface of a light-absorption resin member; pressing a top of the triangle protrusion on a bonding surface of a translucent resin member; bending the translucent resin member toward the bonding surface of the light-absorption resin member so that a second part of the translucent resin member contacts the bonding surface of the light-absorption resin member, wherein the second part of the translucent resin member is disposed around the top of the protrusion; irradiating a laser beam on the triangle protrusion through the translucent resin member so that the triangle protrusion melts; and welding the bonding surface of the translucent resin member to the bonding surface of the light-absorption resin member with melted resin of the triangle protrusion. The triangle protrusion has a height, which provides to set deformation of the translucent resin member within a limit of a tensile strength of the translucent resin member, and the deformation of the translucent resin member is caused by the pressing the top of the protrusion.

In the above method, since the deformation of the translucent resin member is smaller than the limit of the tensile strength of the translucent resin member, a micro clack is not generated by bending stress generated in the translucent resin member near the top of the protrusion.

According to a third aspect of the present disclosure, a mounting structure for welding a light-absorption resin member and a translucent resin member with a laser beam, includes: the light-absorption resin member including a triangle protrusion; the translucent resin member mounted on the light-absorption resin member so that the translucent resin member contacts the light-absorption resin member at a top of the protrusion; and a pressing jig mounted on the translucent resin member to press the translucent resin member toward the light-absorption resin member. The protrusion has a height in a range between 0.03 mm and 0.08 mm, and the protrusion further has a bottom width in a range between 2.5 mm and 3.5 mm.

In the above structure, when the light-absorption resin member and the translucent resin member are welded with the laser beam, deformation of the translucent resin member is smaller than a limit of a tensile strength of the translucent resin member. Therefore, a micro clack is not generated by bending stress generated in the translucent resin member near the top of the protrusion.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The inventor has been studied about a protrusion on a light-absorption resin material to improve a laser beam welding method.

Figure 3:
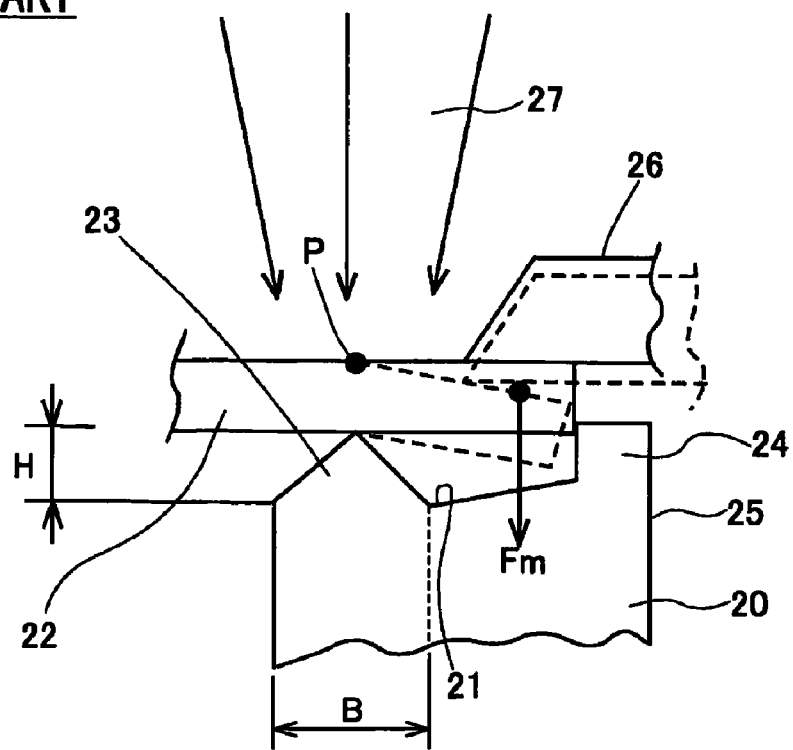
FIG. 3 is a cross sectional view showing another conventional laser beam welding method.

In FIG. 3, the triangle protrusion has a height H in a range between 0.3 mm and 1.0 mm and a bottom width B in a range between 1.5 mm and 2.5 mm.

In the laser beam welding method with the triangle protrusion, the translucent resin cover turns down by almost a height H of the protrusion when the resin material melts. The drop of the translucent resin cover depends on pressing force of the pressing jig. Therefore, it is necessary to press the translucent resin cover downward with the pressing jig by sufficient force.

The pressing force of the pressing jig generates a bending moment Fm in a downward direction. Specifically, the bending moment Fm applies the translucent resin cover at a top of the protrusion as a support point. Thus, the translucent resin cover bends along with a dotted line shown in FIG. 3. This bending moment Fm generates the maximum tensile stress at an upper point P of the translucent resin cover, which corresponds to the top of the protrusion.

When the laser beam is irradiated on the protrusion, the protrusion rapidly melts. At the same time, the temperature of the translucent resin cover increases so that the limit of the tensile strength of the translucent resin cover is reduced. Since it takes much time to flow the melted protrusion toward aside, the tensile stress at the point P exceeds the limit when the laser beam is irradiated on the protrusion. Thus, a micro clack may be generated at the point P of the translucent resin cover. This micro clack may reduce the strength of the translucent resin cover when the thickness of the translucent resin cover is small.

Thus, although gas and air disposed near the melted surface of the protrusion are discharged from the triangle protrusion so that a void is not generated at the connection portion, the clack may be generated in the translucent resin cover.

In view of the above difficulty, a laser beam welding method according to a first aspect of the present disclosure includes: forming a triangle protrusion on a bonding surface of a light-absorption resin member; pressing a top of the protrusion on a bonding surface of the translucent resin member; irradiating a scanning laser beam on the protrusion through the translucent resin member so that the protrusion melts; and bonding the translucent resin member on the light-absorption resin member with the melted resin protrusion. Before the laser beam is irradiated on the protrusion, by using the pressing force of the protrusion, at least two portions of the light-absorption resin member contact a bonding surface of the translucent resin member. One of two portions is a top of the protrusion of the light-absorption resin member, and the other is a predetermined area of a bonding surface of the light-absorption resin member. The predetermined area of the bonding surface is spaced apart from the top of the protrusion by a predetermined distance. The height of the protrusion is designed such that deformation of the translucent resin member caused by the pressing force of the protrusion is smaller than a limit of a tensile strength of the translucent resin member.

The translucent resin member is supported with the light-absorption resin member at two points, which are spaced apart from each other by the predetermined distance. Thus, a micro clack is not generated by the bending stress generated in the translucent resin member near the top of the protrusion.

Since the above method prevents a micro clack from being generated in the translucent resin member, a manufacturing yield is improved.

Further, a laser beam welding method according to a second aspect of the present disclosure includes: forming a triangle protrusion on a bonding surface of a light-absorption resin member; pressing a top of the protrusion on a bonding surface of the translucent resin member; irradiating a scanning laser beam on the protrusion through the translucent resin member so that the protrusion melts; and bonding the translucent resin member on the light-absorption resin member with the melted resin protrusion. Before the laser beam is irradiated on the protrusion, by using the pressing force of the protrusion, the translucent resin member is bent toward a bonding surface of the light-absorption resin member. Thus, an edge of the translucent resin member contacts the bonding surface of the light-absorption resin member. The edge of the translucent resin member is disposed near the top of the protrusion on the bonding surface of the light-absorption resin member. The height of the protrusion is designed such that deformation of the translucent resin member caused by the pressing force of the protrusion is smaller than a limit of a tensile strength of the translucent resin member.

Thus, the translucent resin member is supported on a part of the bonding surface of the light-absorption resin member. The part is adjacent to the top of the protrusion, and wider than a conventional part shown in FIG. 2. Thus, a micro clack is not generated by the bending stress generated in the translucent resin member near the top of the protrusion.

Since the above method prevents a micro clack from being generated in the translucent resin member, a manufacturing yield is improved.

In the above two methods, the height of the protrusion is designed such that deformation of the translucent resin member caused by the pressing force of the protrusion is smaller than a limit of a tensile strength of the translucent resin member. The temperature of the translucent resin member is rapidly increased although an increasing rate of the temperature of the translucent resin member is smaller than that of the light-absorption resin member. As a result, the temperature increase causes to reduce the limit of the tensile strength of the translucent resin member. The stress in the principal surface of the translucent resin member generated by the pressing stress is the tensile stress near the protrusion. The principal surface of the translucent resin member is opposite to the protrusion.

In the above two methods, since the translucent resin member contacts the light-absorption resin member with plane contact or multiple point contact. Thus, the translucent resin member near the triangle protrusion bends slightly, so that the bending stress is small. Accordingly, even when the temperature increase of the translucent resin member caused by the laser beam irradiation provides to reduce the limit of the tensile strength of the translucent resin member, the translucent resin member near the triangle protrusion does not fracture, and a micro clack is not generated in the translucent resin member.

The height H of the protrusion formed on the bonding surface of the light-absorption resin member may be in a range between 0.03 mm and 0.08 mm, and the bottom width of the protrusion may be in a range between 1.0 mm and 2.0 mm. In this case, bonding failure is much reduced.

Figure 2:
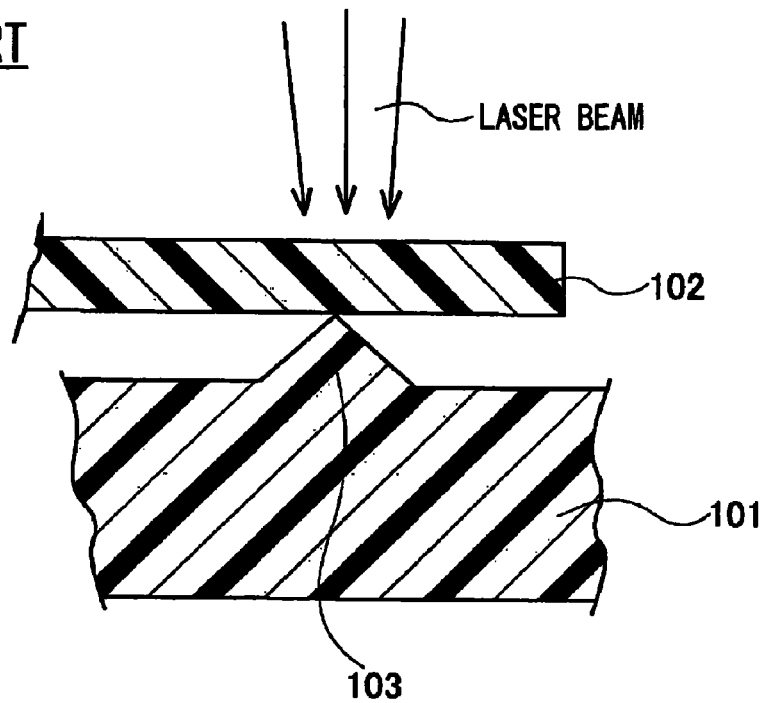
FIG. 2 is a cross sectional view showing a conventional laser beam welding method.

In the above two methods, the dimensions of the triangle protrusion are much smaller than those of the protrusion shown in FIG. 2.

When the protrusion is small, a volume of space between the bonding surface of the translucent resin member and the bonding surface of the light-absorption resin member is also small. Thus, the amount of air in the space is small. Accordingly, the volume of the air to be discharged from the space is small when the translucent resin member and the light-absorption resin member are welded by the laser beam. Thus, a void caused by discharge error of the air from the space is reduced. Here, the height H of the protrusion is set to be larger than concavity and convexity of the bonding surface of the light-absorption resin member. The concavity and convexity of the bonding surface is defined as a surface roughness of the bonding surface of the light-absorption resin member.

Since the height of the protrusion is small, an end of the translucent resin member easily reaches the bonding surface of the light-absorption resin member when the end of the translucent resin member is bent by the pressing force of the pressing jig. Thus, when the end of the translucent resin member contacts the bonding surface of the light-absorption resin member, the translucent resin member is supported on the light-absorption resin member at two points, so that the pressing force is received at two points. The tensile stress at the part of the translucent resin member disposed above the protrusion is much reduced, so that the clack is also reduced. Further, since the height of the protrusion is small, a slope on a side of the protrusion is gentle. The bonding surface of the translucent resin member is bent and easily contacts the slope of the protrusion. Thus, the tensile stress of the translucent resin member is much dispersed, and therefore, the distance between the bonding surface of the light-absorption resin member and the bonding surface of the translucent resin member is reduced, so that the air in the space therebetween is reduced.

The air between the bonding surface of the light-absorption resin member and the bonding surface of the translucent resin member is easily discharged to a side along with a direction in parallel to a longitudinal direction of the protrusion, the side on which the laser beam is not irradiated yet.

JP-A-2005-288934 does not teach the height of the protrusion, and further, does not suggest the above effect of the protrusion.

Figure 1:
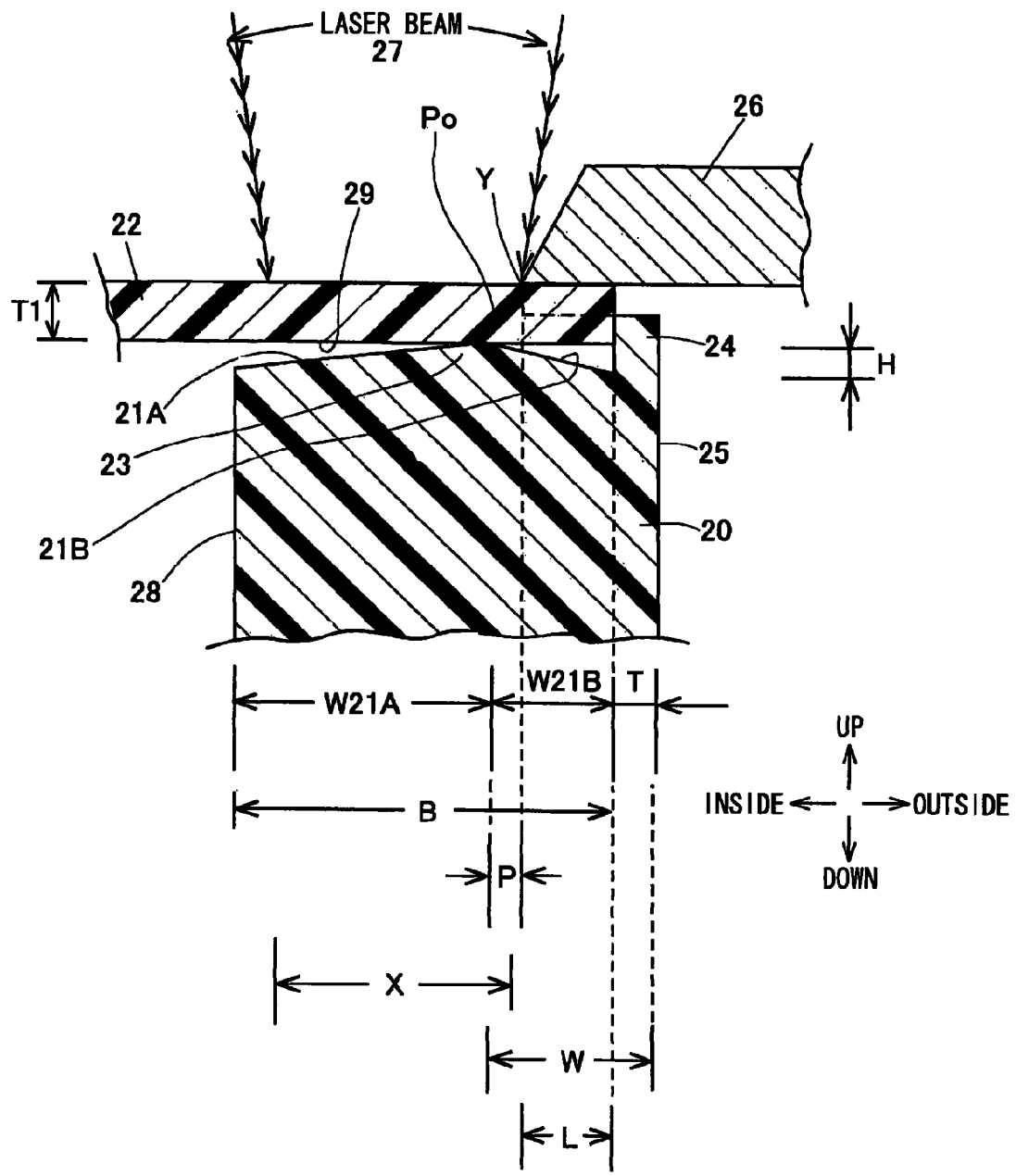
FIG. 1 is a cross sectional view showing a laser beam welding method according to an example embodiment.

In FIG. 1, the width W of the protrusion may be set in a range between 1 mm and 10 mm. The distance L may be set in a range between 0.5 mm and 5 mm. Thus, the width W is larger than the distance L by a predetermined dimension in a range between 0.4 mm and 1.2 mm.

Alternatively, the width W may be set in a range between 1.5 mm and 3 mm, and the distance L may be set in a range between 0.6 mm and 2 mm. Thus, the width W is larger than the distance L by a predetermined dimension in a range between 0.5 mm and 1.0 mm. The height H of the protrusion may be set in a range between 0.04 mm and 0.07 mm, and the bottom width B of the protrusion may be set in a range between 1.2 mm and 1.8 mm. The thickness of the translucent resin member is in a range between 0.4 mm and 1.0 mm. In this case, manufacturing yield is much improved.

The pressing force of the pressing jig per unit area of the contact portion between the translucent resin member and the light-absorption resin member is set in a range between 10N/$mm^2$ and 50N/$mm^2$. The translucent resin member is made of PBT, PPS, PA, PC, ABS, PMMA, PP, POM or PPA. The light-absorption resin member is made of PBT, PPS, PA, PC, ABS, PMMA, PP or PPA. Thus, the manufacturing yield is improved.

The pressing jig presses a part of the translucent resin member toward the bonding surface of the light-absorption resin member. The part of the translucent resin member is disposed from a point Y to an end of the translucent resin member. The point Y is spaced apart from a point Po corresponding to the top of the protrusion by a distance P. Thus, the pressing force of the jig easily applies the pressing force to the translucent resin member.

The end of the bonding surface of the translucent resin member contact-presses to the bonding surface of the light-absorption resin member with the pressing force of the pressing jig before the laser beam is irradiated on the protrusion. Thus, a part of the bonding surface of the light-absorption resin member between the top of the protrusion and the end of the translucent resin member has design degree of freedom, which is improved.

The top of the protrusion is unevenly disposed on one side of the light-absorption resin member toward the end of the jig. In this case, the bending moment applied to the translucent resin member is much reduced.

The distance between the top of the protrusion and the end of the jig is set to be 0.2 times to 2 times larger than the thickness of the translucent resin member. In this case, the tensile strength of the translucent resin member becomes larger than the tensile stress applied to the translucent resin member caused by the bending moment applied to the translucent resin member.

A method for laser beam welding according to an example embodiment is used for bonding a cover to an opening vessel.

As shown in FIG. 1, a reference numeral 20 represents a sidewall of a light-absorption resin vessel as the light-absorption resin member. The sidewall 20 surrounds the opening of the vessel. Reference numeral 21A and 21B represent upper surfaces of the sidewall 20. Reference numeral 22 represents a translucent resin cover as the translucent resin member. Reference numeral 23 represents a triangle protrusion, which protrudes from the sidewall 20. The protrusion 23 includes the upper surfaces 21A and 21B.

The upper surfaces 21A and 21B provide two sides of the protrusion 23 having a triangle cross section. The protrusion 23 is substantially composed of two upper surfaces 21A and 21B. Alternatively, a part of the upper surface of the sidewall 20 may be flat so that the bottom width B of the protrusion 23 is smaller than the thickness of the sidewall 20. In this case, the cross section of the sidewall 20 along with the thickness direction of the sidewall 20 is a triangle shape similar to that shown in FIG. 1.

Reference numeral 24 represents a rib, which stand on an outer periphery of the protrusion 23 along with an outer surface 25 of the sidewall 20. The rib 24 contacts an outer edge of the translucent resin cover 22. Reference numeral 26 is a pressing jig for pressing the outer edge of the translucent resin cover 22. Reference numeral 28 represents an inner surface of the sidewall 20. The sidewall 20 of the vessel may be a cylindrical shape or a polygonal shape. Reference numeral 29 represents a bonding surface of the cover 22. The upper surfaces 21A and 21B of the sidewall 20, i.e., the upper surface of the protrusion 23 provides a bonding surface of the sidewall 20.

A laser beam welding process will be explained as follows. FIG. 1 shows a state before melting.

A part of the translucent resin cover 22 is pressed by the pressing jig 26, the part being disposed outside of a laser beam irradiation region X. The tensile strength of the inside of the translucent resin cover 22, specifically, the tensile strength at a part of the principal surface of the translucent resin cover 22, which is opposite to the protrusion 23, is set within the limit of the tensile strength even when the temperature of the translucent resin cover 22 is increased by the laser beam irradiation. Here, the limit of the tensile strength is break strength. The principal surface of the translucent resin cover 22 is opposite to a backside surface, on which the protrusion 23 contacts. The part of the principal surface corresponds to the top of the protrusion.

The height H of the protrusion 23 is in a range between 0.03 mm and 0.08 mm, and the bottom width B is in a range between 1.0 mm and 2.0 mm. In this case, since the height H of the protrusion 23 is smaller than the bottom width B, the bonding surface 21B of the light-absorption resin vessel has a small slant. Thus, the bottom 29 as the bonding surface of the translucent resin cover 22 contacts the bonding surface 21B of the sidewall 20 of the light-absorption resin vessel with a wide contact area.

Next, when the laser beam 27 is irradiated on the protrusion 23 through the translucent resin cover 22, the protrusion 23 melts so that the translucent resin cover 22 drops toward the upper surfaces 21A and 21B of the sidewall 20 by the pressing force of the pressing jig 26.

Since the translucent resin cover 22 drops, the melted resin material generated from the melted protrusion 23 flows toward both sides of the top Po of the protrusion 23 together with filling small concavity and convexity on the upper surfaces 21A and 21B.

The air disposed between the bonding surface 29 of the translucent resin cover 22 and the upper surfaces 21A and 21B as the bonding surface of the sidewall 20 is discharged to the outside of the space between the bonding surface 29 of the translucent resin cover 22 and the upper surfaces 21A and 21B. The welding between the bonding surface 29 of the translucent resin cover 22 and the upper surfaces 21A and 21B of the sidewall 20 proceeds from the top Po of the protrusion 23 to the right and left sides of the upper surfaces 21A and 21B. The air between the inner upper surface 21A and the bonding surface 29 is discharged to the inside of the sidewall 20 along with the width direction without staying in the space between inner upper surface 21A and the bonding surface 29. The air between the outer upper surface 21B and the bonding surface 29 is discharged to the outside of the sidewall 20 along with the width direction, and further discharged to a side of the upper surface 21B along with a longitudinal direction, the side on which the laser beam is not irradiated yet. The longitudinal direction is perpendicular to the thickness direction of the sidewall 20. As a result, the bottom as the bonding surface 29 of the translucent resin cover 22 is sufficiently welded to the upper surfaces 21A and 21B of the sidewall 20. The laser beam 27 scans along with the longitudinal direction of the sidewall 20 by replacing a laser beam device two-dimensionally or by replacing the light-absorption resin vessel with the translucent resin cover 22 two-dimensionally.

The top Po of the protrusion 23 is spaced apart from the outer surface of the light-absorption resin vessel by a predetermined width W before the laser beam is irradiated on the protrusion 23. The end of the pressing jig 26 is spaced apart from the outer end of the translucent resin cover 22 by the predetermined distance L.

The height H of the protrusion 23 is in a range between 0.03 mm and 0.08 mm, and the bottom width B of the protrusion 23 is in a range between 1.0 mm and 2.0 mm. The bottom width B is a sum of the width 21A of the inner upper surface 21A and the width 21B of the outer upper surface 21B. The width 21A is equal to or three times larger than the width 21B.

In FIG. 1. W is in a range between 1 mm and 10 mm, L in a range between 0.5 mm and 5 mm. W is 0.6 mm to 2 mm larger than L. Preferably, W is in a range between 1.5 mm and 3 mm, L in a range between 0.6 mm and 2 mm. W is 0.5 mm to 1.00 mm larger than L. The height H of the protrusion 23 is in a range between 0.04 mm and 0.07 mm, and the bottom width B is in a range between 1.2 mm and 1.8 mm. The thickness T1 of the translucent resin cover 22 is in a range between 0.4 mm and 1.0 mm. P represents a positional offset between the top Po of the protrusion 23 and the end of the pressing jig 26 in the thickness direction of the sidewall 20. The offset P is in a range between 0.3 mm and 0.8 mm. T represents a latitudinal width of the rib 24. The latitudinal width T is in a range between 0.4 mm and 0.6 mm. The height of the rib 24 is in a range between 0.5 mm and 1.0 mm. X represents a latitudinal width of the laser beam irradiation region of the upper surfaces 21A and 21B. The latitudinal width X provides a width in a direction perpendicular to a scanning direction, which is in parallel to the longitudinal direction of the sidewall 20. The latitudinal width X is substantially equal to a value, which is obtained by subtracting the width L from the bottom width B. The length of the jig 26 in the scanning direction is equal to a whole circumference of the sidewall 20. The pressing force of the jig 26 is about 35 MPa.

The light-absorption resin vessel including the sidewall 20 is made of resin material capable of absorbing the laser beam 27 and having thermo plasticity. The light-absorption resin vessel is made of resin material such as PA (i.e., polyamide), PP (i.e., polypropylene), PC (i.e., poly carbonate), POM (i.e., polyoxymethylene), ABS (i.e., acrylonitrile butadiene styrene), PBT (i.e., polybutylene terephthalate), PPS (i.e., polyphenylene sulfide), and PMMA (i.e., polymethylmethacrylate). A predetermined color agent such as carbon black and pigment is added in the resin material of the light-absorption resin vessel to control a laser beam absorption rate. The translucent resin cover 22 is made of resin material, which may be the same resin material as the light-absorption resin vessel as long as the translucent resin cover 22 has a predetermined transmission factor with regard to the laser beam 27 and has thermo plasticity. Further, as long as the translucent resin cover 22 has the predetermined transmission factor, a color agent may be added in the resin material of the translucent resin cover 22.

The light source for emitting the laser beam 27 is, for example, YAG laser, semiconductor laser, glass-neodymium laser, ruby laser, helium-neon laser, krypton laser, argon laser, hydrogen laser, and nitrogen laser.

Since the height H of the protrusion 23 is very small, a micro crack is prevented from being generated in the translucent resin cover 22 at a part corresponding to the top Po of the protrusion 23.

The top Po of the protrusion 23 shifts from the center of the bottom of the protrusion 23 toward the jig 26. The distance P between the top Po of the protrusion 23 and the end Y of the jig 26 is reduced, so that the bending moment applied to the translucent resin cover 22 is reduced. Thus, the generation of micro crack is reduced. Thus, the shift of the top Po of the protrusion 23 provides reduction of the micro crack without limiting the dimensions of the protrusion 23 and the dimensions of the sidewall 20.

When the height H of the protrusion 23 is sufficiently small, the top Po of the protrusion 23 may shift from the center of the protrusion 23 toward a direction opposite to the jig 26. In this case, the bending moment applied to the translucent resin cover 22 is small. Thus, the crack generation is prevented.

Figure 4:
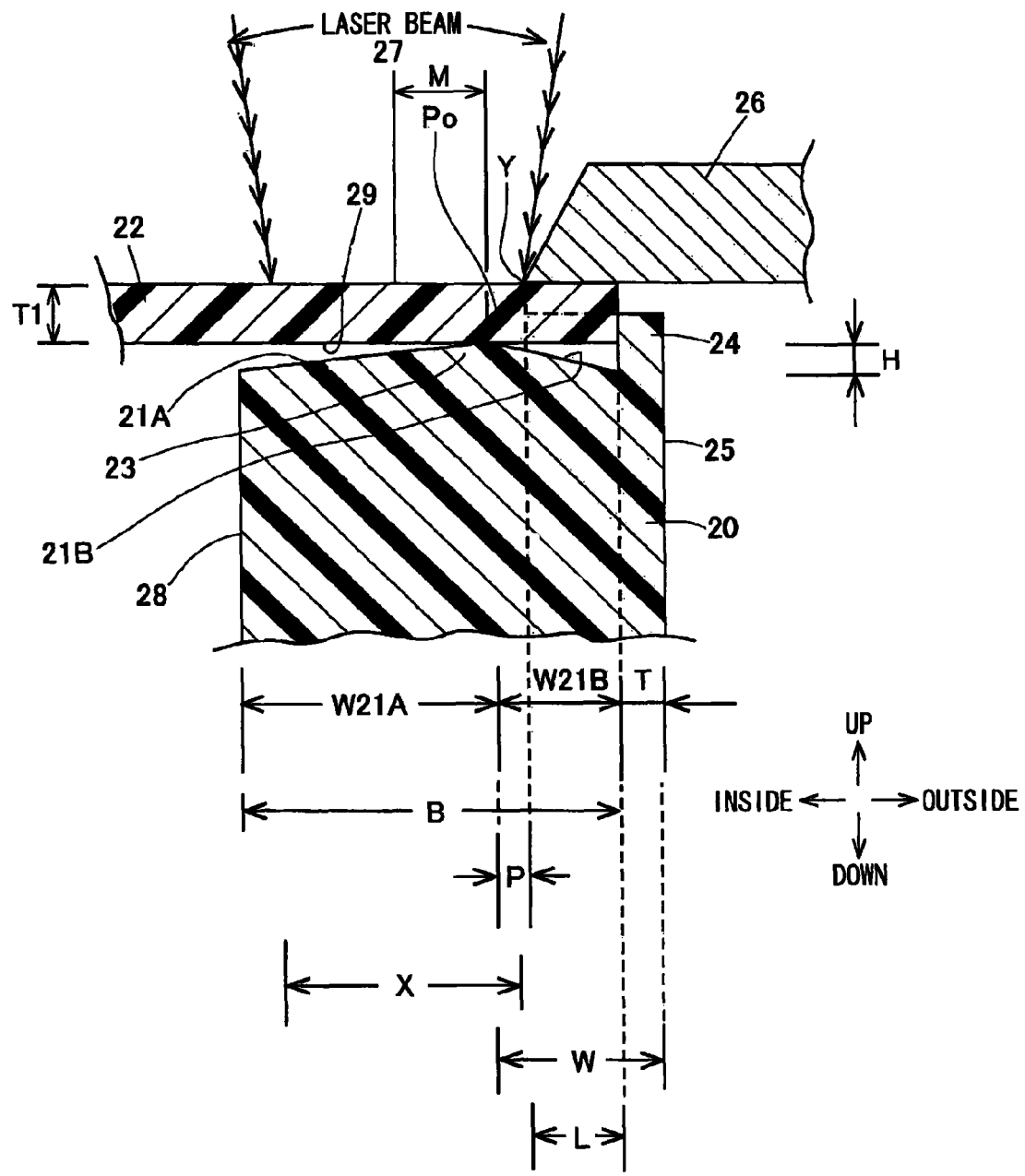
FIG. 4 is a cross sectional view showing a laser beam welding method according to another example embodiment.

FIG. 4 shows that the top Po of the protrusion 23 shifts from a center of a spot of the laser beam 27 by a predetermined distance M. Specifically, the top Po shifts from the center of the laser beam toward the jig 26. In this case, the melted resin from the protrusion 23 flows toward the rib 24, so that adhesiveness between the translucent resin cover 22 and the inner upper surface 21A increases.

The above disclosure has the following aspects.

According to a first aspect of the present disclosure, a method for laser beam welding includes: forming a triangle protrusion on a bonding surface of a light-absorption resin member; pressing a top of the triangle protrusion on a bonding surface of a translucent resin member; contacting the top of the protrusion and a predetermined part of the bonding surface of the light-absorption resin member on the bonding surface of the translucent resin member; irradiating a laser beam on the triangle protrusion through the translucent resin member so that the triangle protrusion melts; and welding the bonding surface of the translucent resin member to the bonding surface of the light-absorption resin member with melted resin of the triangle protrusion. The triangle protrusion has a height, which provides to set deformation of the translucent resin member within a limit of a tensile strength of the translucent resin member, and the deformation of the translucent resin member is caused by the pressing the top of the protrusion.

In the above method, since the deformation of the translucent resin member is smaller than the limit of the tensile strength of the translucent resin member, a micro clack is not generated by bending stress generated in the translucent resin member near the top of the protrusion.

Alternatively, the light-absorption resin member may contact the translucent resin member at a plurality of points including the top of the protrusion and the predetermined part of the bonding surface of the light-absorption resin member.

Alternatively, the pressing the top of the triangle protrusion may be performed by a pressing jig. The pressing jig presses a first part of the translucent resin member toward the bonding surface of the light-absorption resin member. The translucent resin member includes a contact point, at which the top of the protrusion contacts the bonding surface of the translucent resin member. The translucent resin member further includes an end, and the first part of the translucent resin member is disposed from a point of the translucent resin member to the end, the point being spaced apart from the contact point toward the end by a first distance.

Further, the first distance may be in a range between 0.3 mm and 0.8 mm. The height of the protrusion is in a range between 0.03 mm and 0.08 mm, and the protrusion has a bottom width in a range between 2.5 mm and 3.5 mm. The protrusion includes a first surface and a second surface so that a contact point between the first and second surfaces provides the top of the protrusion. The first surface has a width, which is equal to or three times larger than a width of the second surface, and the translucent resin member has a thickness in a range between 0.4 mm and 1.0 mm.

Alternatively, the height of the protrusion may be in a range between 0.03 mm and 0.08 mm, and the protrusion may have a bottom width in a range between 2.5 mm and 3.5 mm.

Alternatively, the laser beam may have an irradiation center, which is spaced apart from the top of the protrusion by a second distance.

According to a second aspect of the present disclosure, a method for laser beam welding includes: forming a triangle protrusion on a bonding surface of a light-absorption resin member; pressing a top of the triangle protrusion on a bonding surface of a translucent resin member; bending the translucent resin member toward the bonding surface of the light-absorption resin member so that a second part of the translucent resin member contacts the bonding surface of the light-absorption resin member, wherein the second part of the translucent resin member is disposed around the top of the protrusion; irradiating a laser beam on the triangle protrusion through the translucent resin member so that the triangle protrusion melts; and welding the bonding surface of the translucent resin member to the bonding surface of the light-absorption resin member with melted resin of the triangle protrusion. The triangle protrusion has a height, which provides to set deformation of the translucent resin member within a limit of a tensile strength of the translucent resin member, and the deformation of the translucent resin member is caused by the pressing the top of the protrusion.

In the above method, since the deformation of the translucent resin member is smaller than the limit of the tensile strength of the translucent resin member, a micro clack is not generated by bending stress generated in the translucent resin member near the top of the protrusion.

According to a third aspect of the present disclosure, a mounting structure for welding a light-absorption resin member and a translucent resin member with a laser beam, includes: the light-absorption resin member including a triangle protrusion; the translucent resin member mounted on the light-absorption resin member so that the translucent resin member contacts the light-absorption resin member at a top of the protrusion; and a pressing jig mounted on the translucent resin member to press the translucent resin member toward the light-absorption resin member. The protrusion has a height in a range between 0.03 mm and 0.08 mm, and the protrusion further has a bottom width in a range between 2.5 mm and 3.5 mm.

In the above structure, when the light-absorption resin member and the translucent resin member are welded with the laser beam, deformation of the translucent resin member is smaller than a limit of a tensile strength of the translucent resin member. Therefore, a micro clack is not generated by bending stress generated in the translucent resin member near the top of the protrusion.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for laser beam welding comprising:
   forming a triangle protrusion on a bonding surface of a light-absorption resin member;
   pressing a top of the triangle protrusion on a bonding surface of a translucent resin member;
   contacting the top of the protrusion and a predetermined part of the bonding surface of the light-absorption resin member on the bonding surface of the translucent resin member;
   irradiating a laser beam on the triangle protrusion through the translucent resin member so that the triangle protrusion melts; and
   welding the bonding surface of the translucent resin member to the bonding surface of the light-absorption resin member with melted resin of the triangle protrusion; wherein
   the predetermined part of the bonding surface of the light-absorption resin member is separated from the top of the protrusion by a predetermined distance;
   the pressing the top of the protrusion causes deformation of the translucent resin member so that the top of the protrusion and the predetermined part of the bonding surface of the light-absorption resin member contact on the bonding surface of the translucent resin member,
   the pressing the top of the protrusion before the irradiating the laser beam is performed so that the deformation of the translucent resin member is generated within a limit of a tensile strength of the translucent resin member;
   the pressing the top of the triangle protrusion is performed by a pressing jig,
   the pressing jig presses a first part of the translucent resin member toward the bonding surface of the light-absorption resin member,
   the translucent resin member includes a contact point, at which the top of the protrusion contacts the bonding surface of the translucent resin member,
   the translucent resin member further includes an end,
   the first part of the translucent resin member is disposed from a point of the translucent resin member to the end, the point being spaced apart from the contact point toward the end by a first distance;
   the first distance is in a range between 0.3 mm and 0.8 mm,
   a height of the protrusion is in a range between 0.03 mm and 0.08 mm,
   the protrusion has a bottom width in a range between 2.5 mm and 3.5 mm,
   the protrusion includes a first surface and a second surface so that a contact point between the first and second surfaces provides the top of the protrusion,
   the first surface has a width, which is equal to or three times larger than a width of the second surface, and
   the translucent resin member has a thickness in a range between 0.4 mm and 1.0 mm.

2. The method according to claim 1,
   wherein the light-absorption resin member contacts the translucent resin member at a plurality of points including the top of the protrusion and the predetermined part of the bonding surface of the light-absorption resin member.

3. The method according to claim 1,
   wherein the laser beam has an irradiation center, which is spaced apart from the top of the protrusion by a second distance.

4. A method for laser beam welding comprising:
   forming a triangle protrusion on a bonding surface of a light-absorption resin member;
   pressing a top of the triangle protrusion on a bonding surface of a translucent resin member;
   bending the translucent resin member toward the bonding surface of the light-absorption resin member so that a second part of the translucent resin member contacts the bonding surface of the light-absorption resin member, wherein the second part of the translucent resin member is disposed around the top of the protrusion, and is a surface area of the bonding surface of the translucent resin member;
   irradiating a laser beam on the triangle protrusion through the translucent resin member so that the triangle protrusion melts; and
   welding the bonding surface of the translucent resin member to the bonding surface of the light-absorption resin member with melted resin of the triangle protrusion; wherein
   the bending the translucent resin member causes deformation of the translucent resin member so that the second part of the translucent resin member contacts on the bonding surface of the light-absorption resin member, and
   the bending the translucent resin member before the irradiating the laser beam is performed so that the deformation of the translucent resin member is generated within a limit of a tensile strength of the translucent resin member.

5. The method according to claim 4,
   wherein a height of the protrusion is in a range between 0.03 mm and 0.08 mm, and
   wherein the protrusion has a bottom width in a range between 2.5 mm and 3.5 mm.

6. The method according to claim 4,
   wherein the laser beam has an irradiation center, which is spaced apart from the top of the protrusion by a second distance.

* * * * *